United States Patent [19]

Yarusso

[11] Patent Number: 4,662,100
[45] Date of Patent: May 5, 1987

[54] FISHING LURE

[76] Inventor: Gerard F. Yarusso, 15851 Marystown Rd., Shakopee, Minn. 55379

[21] Appl. No.: 872,932

[22] Filed: Jun. 11, 1986

[51] Int. Cl.⁴ .................................................. A01K 85/00
[52] U.S. Cl. .................................. 43/42.37; 43/42.45
[58] Field of Search ............... 43/42.37, 4.5, 42.22, 43/42.39, 42.45, 42.41, 44.96, 44.51

[56] References Cited

U.S. PATENT DOCUMENTS

| | | | |
|---|---|---|---|
| 2,479,675 | 8/1949 | Findlay | 43/42.39 |
| 2,557,599 | 6/1951 | Dunmire | 43/42.39 |
| 3,137,962 | 6/1964 | Linley | 43/44.96 |
| 3,180,049 | 4/1965 | Gunderson | 43/42.37 |
| 3,483,651 | 12/1969 | Borger | 43/42.37 |
| 4,533,333 | 6/1984 | Olson | 43/42.5 |

FOREIGN PATENT DOCUMENTS

| | | | |
|---|---|---|---|
| 8871432 | 5/1971 | Canada | 43/42.45 |
| 274149 | 8/1951 | Switzerland | 43/42.41 |
| 5603 | of 1907 | United Kingdom | 43/42.45 |

*Primary Examiner*—Nicholas P. Godici
*Assistant Examiner*—Karen Skillman
*Attorney, Agent, or Firm*—Kinney & Lange

[57] ABSTRACT

A fishing lure has a body with a diamond-shaped cross section with a first front apex and a second rear apex disposed along an axis and third and fourth apexes disposed along opposite sides of the axis. The body has a bow portion with first and second surfaces extending from the first apex rearwardly to the third and fourth apexes, respectively, the first and second surfaces forming an edge extending from the first apex to a keel portion. A hook extends rearwardly from the second apex and an eyelet is disposed on the edge of the bow portion and rearwardly from the first apex and forward of the keel portion.

7 Claims, 5 Drawing Figures

U.S. Patent  May 5, 1987  4,662,100
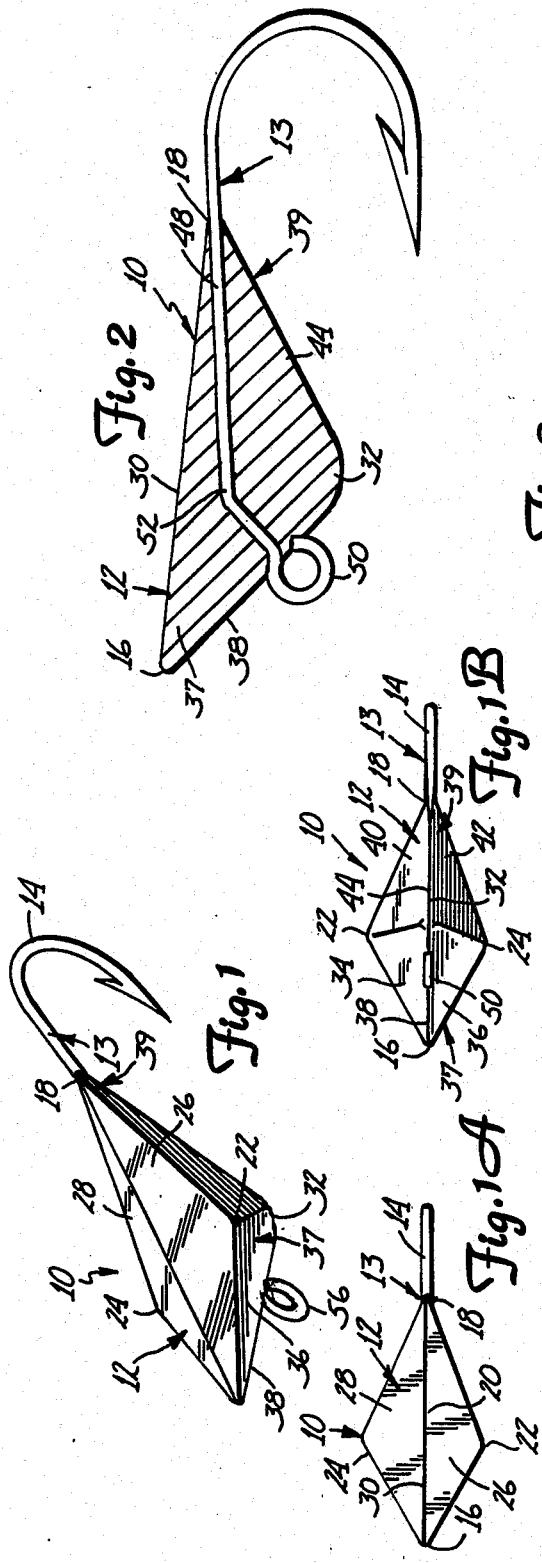
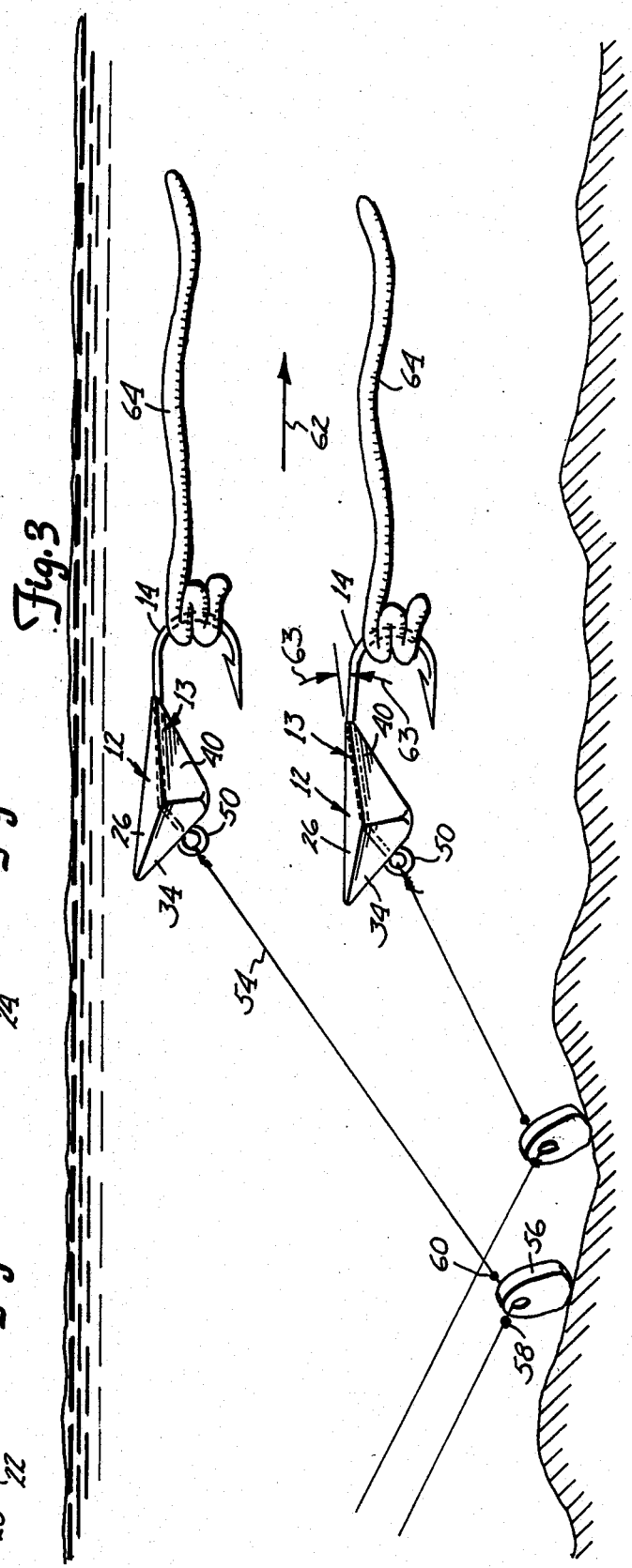

FISHING LURE

BACKGROUND OF THE INVENTION

1. Field of the Invention

The present invention relates to fishing lures, and in particular, the present invention relates to submersible fishing lures.

2. Description of the Prior Art

There are numerous types of lures for use in attracting and catching fish. One type that is popular for trolling or for use in a flowing body of water, such as a river or a stream, is a jig having a body that is submersible below the surface of the water while being able to float above the bottom. The body is made of a material that is lighter than water so that the lure floats above the bottom. A weight is attached to the fishing line forward of the lure, keeping the lure from floating to the top of the surface.

One problem with jigs of this type is that due to the action of the water against the lure, the lure, on occasion, spins about its axis. It would be desirable in many situations to have a lure that does not spin so that it imitates a minnow in all water/lure interactions.

SUMMARY OF THE INVENTION

The present invention includes a fishing lure having a body with a diamond-shaped cross section with a first front apex and a second rear apex disposed along an axis and third and fourth apexes disposed along opposite sides of the axis. The body has a bow portion with first and second surfaces extending rearwardly from the first apex to the third and fourth apexes, respectively, the first and second surfaces forming an edge extending from the first apex to a keel portion. A hook extends rearwardly from the second apex and an eyelet is disposed on the edge of the bow portion and rearwardly from the first apex and forward of the keel portion.

BRIEF DESCRIPTION OF THE DRAWINGS

FIG. 1 is a perspective view of the lure of the present invention.
FIG. 1A is a top view of the lure.
FIG. 1B is a bottom view of the lure.
FIG. 2 is a cross sectional view of the lure.
FIG. 3 is an elevational view of the lure in use.

DETAILED DESCRIPTION OF THE PREFERRED EMBODIMENTS

The lure of the present invention is generally indicated at 10 in FIGS. 1, 1A and 1B. The lure 10 has a body 12 and a hook 13 having a hook portion 14.

The body 12 is made of a material having a density lighter than water, such as a foamed plastic. One suitable foamed plastic is a rigid polyurethane foam. The body is made by injecting the foamed plastic into a mold cavity with the hook having been inserted into the mold cavity prior to injection, such that foam surrounds most of the hook. The foam is allowed to cure and the lure is removed.

The body 12 has a diamond configuration, as best seen in FIG. 1A. The body 12 has a front apex 16 and a rearward apex 18, each apex 16 and 18 disposed along a primary axis 20. A third apex 22 and a fourth apex 24 are disposed along opposite sides of the axis 20 along a secondary axis that is approximately perpendicular to the primary axis 20. The third and fourth apexes are disposed approximately midway between the apexes 16 and 18.

A first top surface 26 extends between the apexes 16, 18 and 22 and has a triangular configuration. Similarly, a second top surface 28 extends between apexes 16, 18 and 24 and also has a triangular configuration similar to the surface 26. The first and second surfaces 26 and 28 form a top ridge or edge 30 that extends substantially parallel to the axis 20 from the first apex 16 to the second apex 18. The surfaces 26 and 28 are inclined downwardly such that the third and fourth apexes are located below the top ridge 30.

The body 12 has a keel portion 32 that forms the lowermost portion of the lure when the lure is in the water. The third and fourth apexes are disposed between the ridge 30 and the keel portion 32, about one-third the distance from the ridge 30 to the keel portion 32. Extending from the first forward apex 16 are third and fourth bottom surfaces 34 and 36 forming a bow portion 37. The surfaces 34 and 36 extend rearwardly from the apex 16 to the keel portion 32. The third surface 34 is defined by the first apex 16 and the apex 22 and the keel portion 32. The fourth surface 36 is defined by the apex 16, the apex 24 and the keel portion 32. The surfaces 34 and 36 join each other at a bow edge 38 that extends rearwardly to the keel portion 32.

The body further includes a stern portion 39 that includes fifth and sixth bottom surfaces 40 and 42, respectively. The surfaces 40 and 42 extend rearwardly from the keel portion 32 and the apexes 22 and 24, respectively, to the apex 18. The surfaces 40 and 42 are joined along a stern edge 44 that extends from the keel portion 32 rearwardly to the apex 18.

The surfaces 34, 36, 40 and 42 are all substantially triangular in configuration. In addition, all the angles of each apex are obtuse angles.

The hook portion 14 extends from the apex 18 rearwardly of the body 12. The hook 13 further includes a shank portion 48 that extends through the body 12 and an eyelet 50 extending out of the bow portion 37. The eyelet 50 is located on the edge 38, below and rearward of the apex 16, and above and forward of the keel portion 32, as best illustrated in FIGS. 1, 1B and 2, approximately two-thirds of the distance from the apex 16 to the keel portion 14. As best illustrated in FIG. 2, the shank portion 48 has a bend 52 to prevent the body 12 from rotating about the hook 46 even after the lure has been used for a considerable period of time.

The configuration of the lure of the present invention keeps the lure in a position such that the bow portion faces against the force of the water, preventing the lure from turning about on its axis. Although the mechanism is not fully understood, it is believed that as the water interacts with the surfaces 34 and 36 of the bow portion, the lure is prevented from spinning about on its axis. The desired interaction between the bow portion and the water is assured by the eyelet being positioned on the edge 38 and specifically about two-thirds the distance from the apex 16 to the keel portion.

The lure of the present invention is shown in use in FIG. 3. The lure is attached to a fishing line 54 at the eyelet 50. A sinker 56 is attached to the line forward of the lure and is kept in place by stops 58 and 60 located on both sides of the lure. The direction of the water flow is generally indicated by arrow 62. A bait 64 may be attached to the hook portion 14 to further entice fish.

In a further aspect of the present invention, when the bait 64 is attached to the hook portion 14, the depth of the lure in the water can be adjusted by bending the hook portion 14 relative to the body 12, as indicated by arrow 63. If the hook portion 14 is bent downwardly, then the lure of the present invention will tend to float nearer the bottom. In contrast, if the hook portion is bent upwardly, the lure will tend to float nearer the surface of the water. In all cases, the bow portion 37 of the lure prevents the lure from spinning about its axis.

The lure of the present invention can be used both in flowing waters, such as a river or a creek, or can be used while trolling. In either manner, the lure remains in a position where the keel portion stays at a lowermost position with the bow portion acting against the flow of the water in the manner described previously.

Although the present invention has been described with reference to preferred embodiments, workers skilled in the art will recognize that changes may be made in form and detail without departing from the spirit and scope of the invention.

What is claimed is:

1. A fish lure comprising:

a body having a generally diamond-shaped cross section and a primary axis with a first front and a second rear apex disposed along the primary axis and third and fourth apexes disposed along either side of the primary axis, respectively, the body having a keel portion with an edge extending from the first apex to the keel portion and with first and second surfaces extending rearwardly from the first apex to the keel portion and wherein the third and fourth apexes are disposed approximately midway between the first and second apexes and along a secondary axis that is approximately perpendicular to the primary axis and wherein the body has a top surface with a top ridge parallel to the primary axis and the top surface extending between the first, second, third and fourth apexes with the third and fourth apexes located between the ridge and the keel portion; and a hook portion extending rearwardly from the second apex; and an eyelet for attaching the fishing line disposed along the edge and rearwardly from the first apex and forward of the keel portion.

2. The lure of claim 1 further including a hook that includes the hook portion and the eyelet and a shank portion extending through the body.

3. The lure of claim 2 wherein the shank portion has a bend disposed in the body preventing the body from rotating about the hook.

4. The lure of claim 1 wherein the body is made of a foamed plastic.

5. The lure of claim 3 wherein the foamed plastic is a polyurethane.

6. The lure of claim 1 wherein the third and fourth apexes are located approximately one-third the distance from the top ridge to the keel portion.

7. The lure of claim 1 wherein the eyelet is positioned about two-thirds the distance from the first apex to the keel portion.

* * * * *